United States Patent
Yang et al.

(10) Patent No.: US 12,127,050 B2
(45) Date of Patent: *Oct. 22, 2024

(54) SYSTEMS AND METHODS FOR PERFORMING SIDELINK COMMUNICATION INVOLVING MULTIPLE RADIO ACCESS TECHNOLOGIES

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jongkeun Park, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,107

(22) Filed: Aug. 7, 2023

(65) Prior Publication Data

US 2023/0379770 A1    Nov. 23, 2023

Related U.S. Application Data

(63) Continuation of application No. 17/719,116, filed on Apr. 12, 2022, now Pat. No. 11,770,746, which is a continuation of application No. PCT/KR2021/005952, filed on May 12, 2021.

(30) Foreign Application Priority Data

May 21, 2020 (KR) .................... 10-2020-0060786

(51) Int. Cl.
*H04W 36/00* (2009.01)
*H04L 5/00* (2006.01)
*H04L 27/26* (2006.01)
*H04W 36/14* (2009.01)

(52) U.S. Cl.
CPC ....... *H04W 36/0066* (2013.01); *H04L 5/0053* (2013.01); *H04L 27/26025* (2021.01); *H04W 36/0061* (2013.01); *H04W 36/14* (2013.01)

(58) Field of Classification Search
CPC ......... H04W 4/40; H04W 76/14; H04W 4/46; H04W 4/44; H04W 36/0033; H04W 36/0066; H04W 36/0061; H04W 36/14; H04W 36/0072; H04W 72/04; H04W 92/02; H04W 92/18; H04L 5/0048; H04L 5/0053; H04L 5/003; H04L 27/26025
See application file for complete search history.

(56) References Cited

U.S. PATENT DOCUMENTS

2019/0246306 A1* 8/2019 Yang .................. H04L 27/26
2021/0360725 A1* 11/2021 Tang .................. H04W 24/04
2022/0116172 A1* 4/2022 Tang ................ H04W 74/0825
2022/0377777 A1* 11/2022 Choi ................... H04L 1/1812

* cited by examiner

*Primary Examiner* — Allahyar Kasraian
(74) *Attorney, Agent, or Firm* — BRYAN CAVE LEIGHTON PAISNER LLP

(57) ABSTRACT

One disclosure of the present specification provides a method by which a UE performs sidelink communication. The method may comprise the steps of: performing sidelink communication on the basis of a first RAT; switching a RAT for the sidelink communication from the first RAT to a second RAT; performing the sidelink communication on the basis of the second RAT; and communicating with a base station on the basis of NR.

13 Claims, 11 Drawing Sheets

SYSTEMS AND METHODS FOR PERFORMING SIDELINK COMMUNICATION INVOLVING MULTIPLE RADIO ACCESS TECHNOLOGIES

This application is a Continuation Application of Ser. No. 17/719,116, filed on Apr. 12, 2022, which is a Continuation Application of International Application No. PCT/KR2021/005952, filed on May 12, 2021, which claims the benefit of and priority to Korean Application No. 10-2020-0060786, filed on May 21, 2020, the contents of which are all hereby incorporated by reference herein in their entirety.

FIELD OF THE DISCLOSURE

The present disclosure relates to mobile communication.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

A way for efficiently performing communication with a base station by a UE supporting both LTE V2X (or SL) communication and NR V2X (or SL) communication has not been discussed. For example, when the UE supports all of NR V2X SL communication, LTE V2X SL communication, and Uu communication, conventionally when RF switching between NR V2X SL communication and LTE V2X SL communication is performed, there was no way to effectively support Uu communication.

SUMMARY

Accordingly, a disclosure of the present specification has been made in an effort to solve the aforementioned problem.

One disclosure of the present specification provides a method for a UE to perform sidelink communication. The method includes: performing the sidelink communication based on a first RAT; switching a RAT for the sidelink communication from the first RAT to a second RAT; performing the sidelink communication based on the second RAT; and based on NR, performing communication with a base station.

One disclosure of the present specification provides a UE that performs sidelink communication. The UE includes: at least one processor; and at least one memory for storing instructions and operably electrically connectable with the at least one processor, wherein the operation performed based on the instructions being executed by the at least one processor includes: switching a RAT for the sidelink communication from a first RAT to a second RAT; performing the sidelink communication based on the second RAT; and based on the NR, performing communication with a base station.

One disclosure of the present specification provides an apparatus in mobile communication. The apparatus includes: at least one processor; and at least one memory for storing instructions and operably electrically connectable with the at least one processor, wherein the operations performed based on the instructions being executed by the at least one processor include: switching a RAT for the sidelink communication from a first RAT to a second RAT; performing the sidelink communication based on the second RAT; and based on the NR, performing communication with a base station.

A non-transitory computer-readable storage medium having instructions recorded thereon is provided. The instructions, when executed by one or more processors, cause the one or more processors to: switch a RAT for the sidelink communication from a first RAT to a second RAT; perform the sidelink communication based on the second RAT; and based on the NR, perform communication with a base station.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
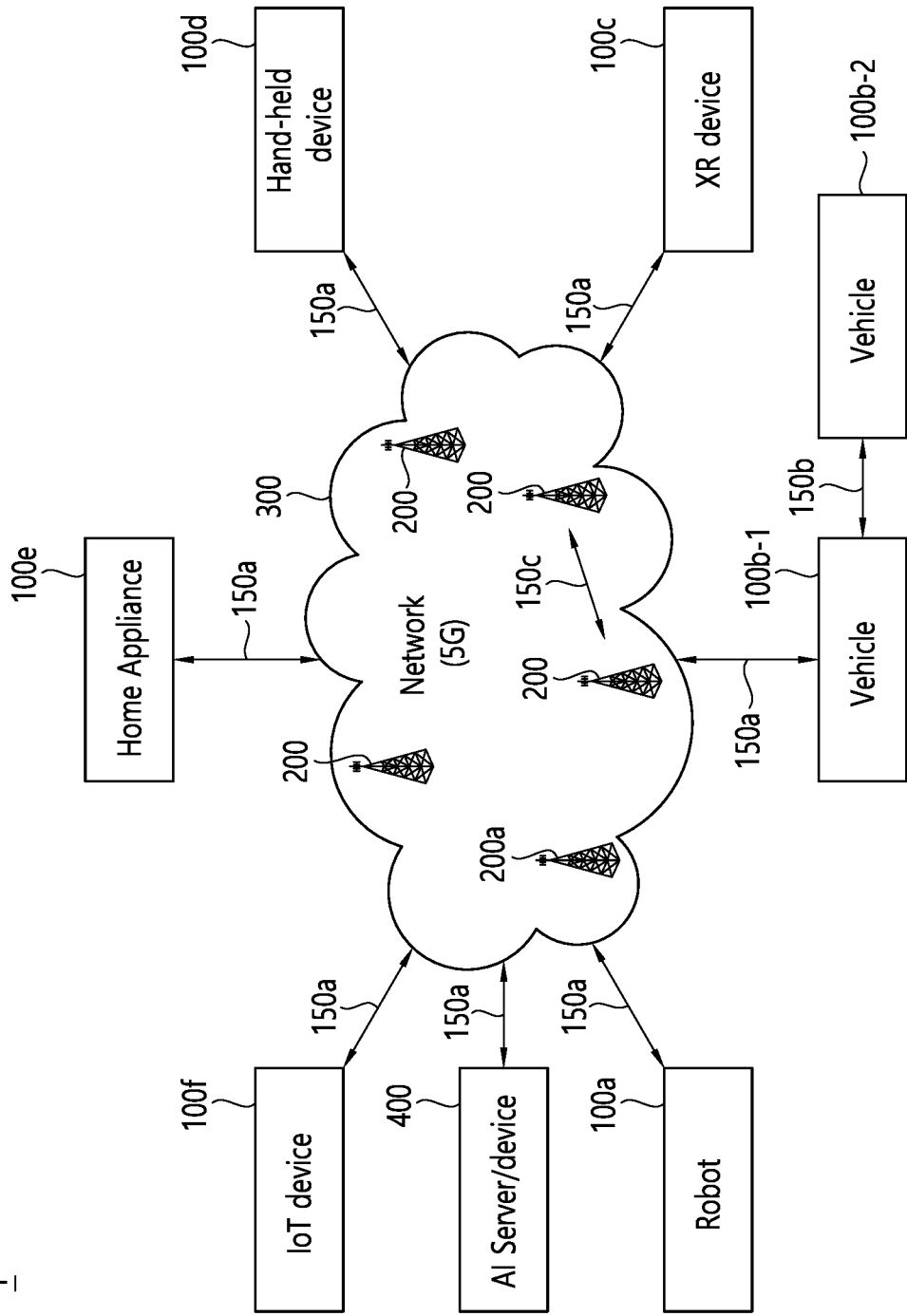
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
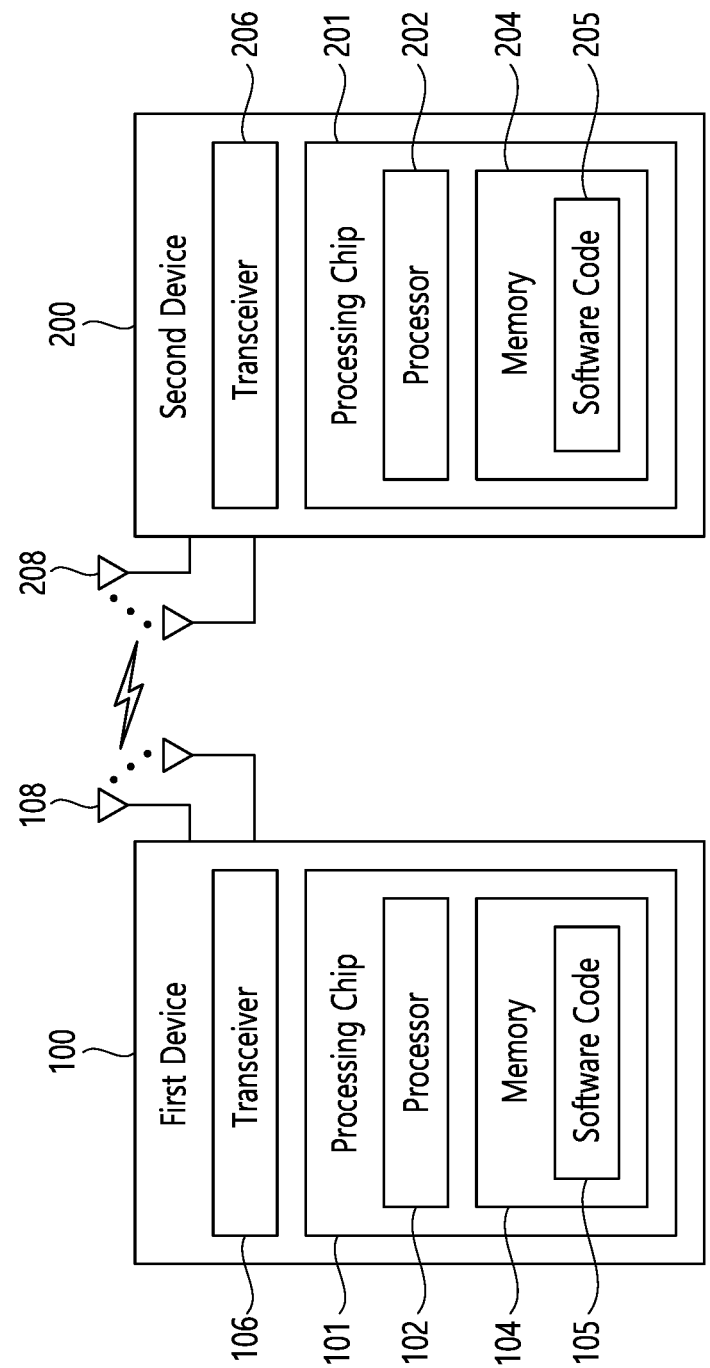
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals)

from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
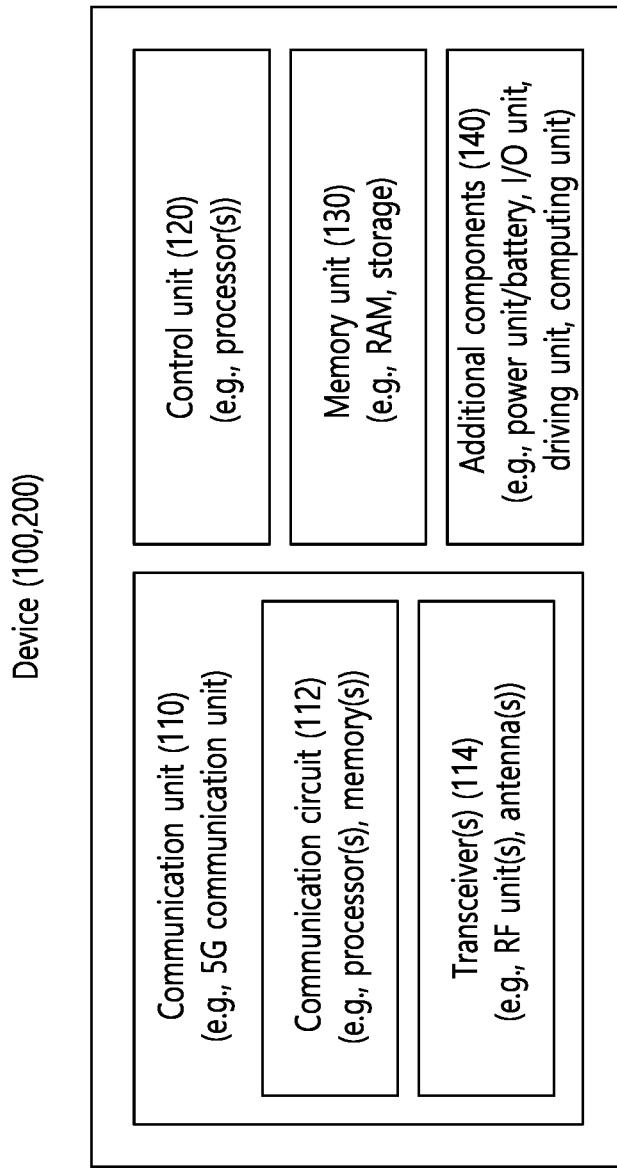
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BS s (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
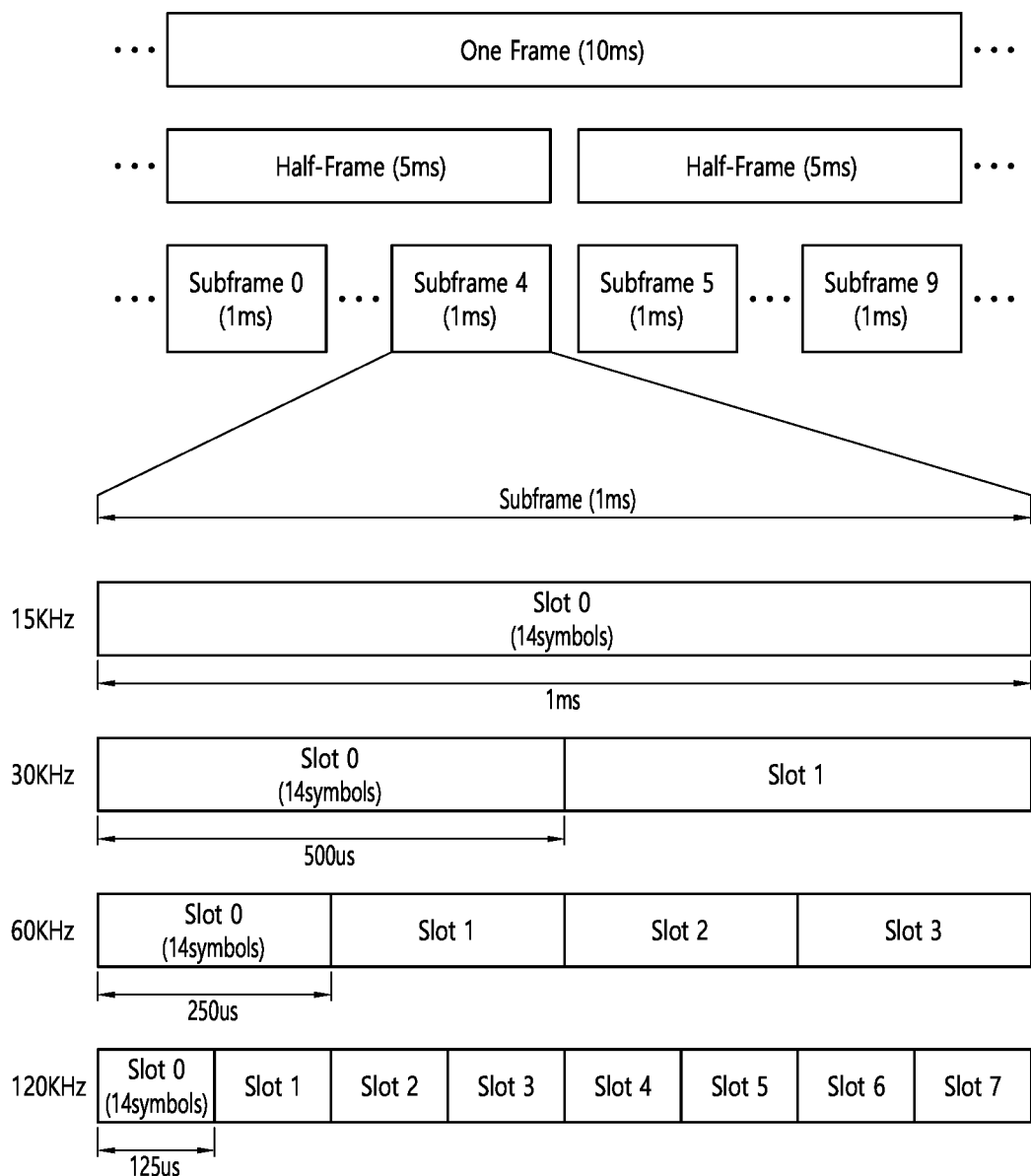
FIG. 4 shows an example of the structure of a radio frame of NR to which implementations of the present disclosure is applied.

FIG. 4 shows an example of the structure of a radio frame of NR to which implementations of the present disclosure is applied.

FIG. 4 shows the structure of a radio frame of NR according to an embodiment of the present disclosure. FIG. 5 may be combined with various embodiments of the present disclosure.

Referring to FIG. 4, a radio frame may be used for UL transmission and DL transmission in NR. A radio frame is 10 ms in length, and may be defined by two 5-ms half-frames (HF). An HF may include five 1-ms subframes (SF). A SF may be divided into one or more slots, and the number of slots in an SF may be determined according to subcarrier spacing (SCS). Each slot may include 12 or 14 OFDM(A) symbols according to a cyclic prefix (CP).

When a normal CP is used, each slot may include 14 symbols, whereas in an extended CP case, each slot may include 12 symbols. Herein, a symbol may be an OFDM symbol (or CP-OFDM symbol) or a Single Carrier (SC)-FDMA symbol (or Discrete Fourier Transform-spread-OFDM (DFT-s-OFDM) symbol).

Hereinafter, V2X or SL communication will be described.

Figure 5A:
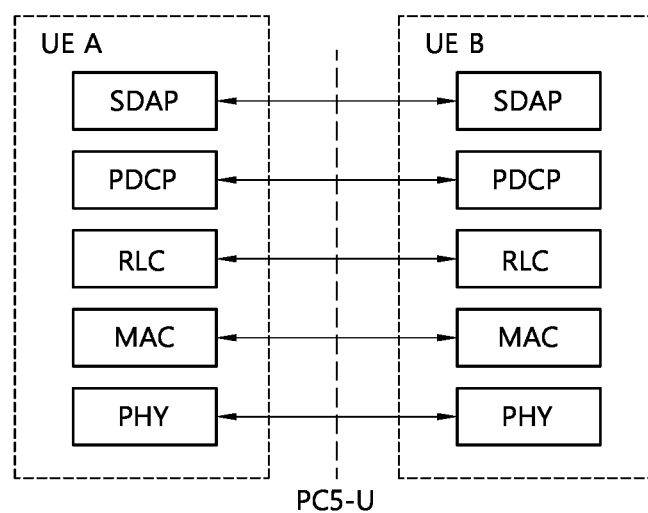
FIGS. 5a and 5b show an example of a radio protocol architecture for SL communication to which implementations of the present disclosure is applied.
Figure 5B:
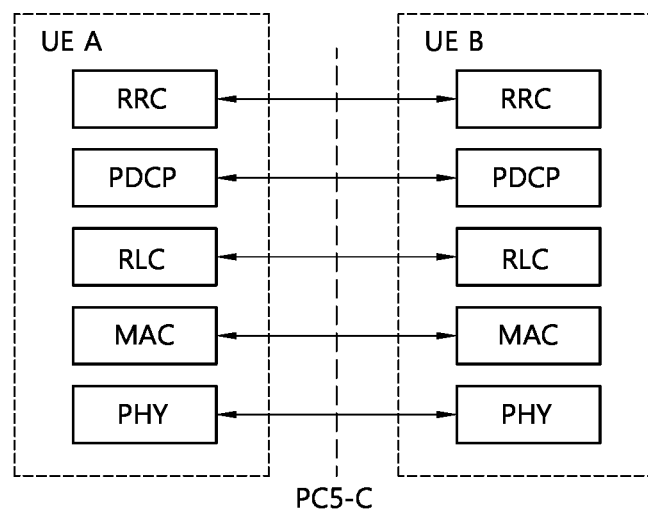

FIGS. 5*a* and 5*b* show an example of a radio protocol architecture for SL communication to which implementations of the present disclosure is applied.

FIGS. 5*a* and 5*b* show a radio protocol architecture for SL communication according to one embodiment of the present disclosure. The embodiments of FIGS. 5*a* and 5*b* may be combined with various embodiments of the present disclosure. Specifically, FIG. 5*a* shows a user plane protocol stack, and FIG. 5*b* shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
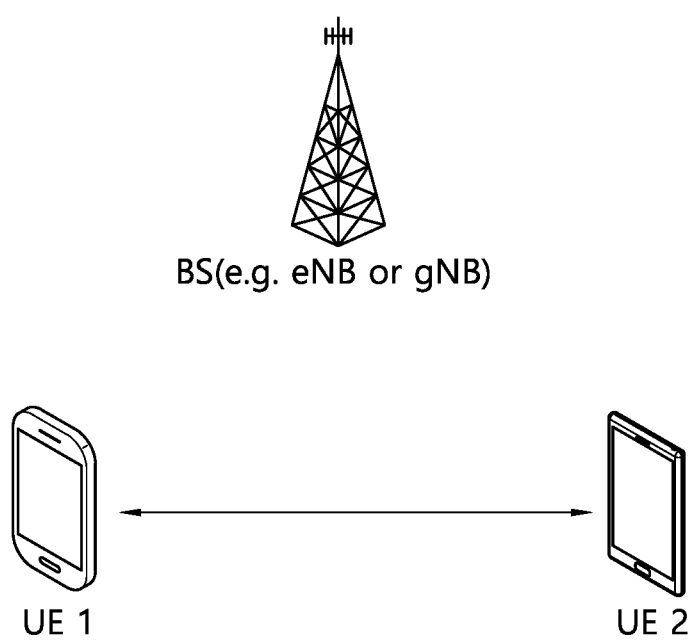
FIG. 6 shows an example of a UE performing V2X or SL communication to which implementations of the present disclosure is applied.

FIG. 6 shows an example of a UE performing V2X or SL communication to which implementations of the present disclosure is applied.

FIG. 6 shows a UE performing V2X or SL communication according to one embodiment of the present disclosure.

The embodiment of FIG. 6 may be combined with various embodiments of the present disclosure.

Referring to FIG. 6, the term "UE" in V2X or SL communication may mainly refer to a terminal of a user. However, when a network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

For reference, Table 3 below shows an example of an operating band used for V2X (or SL) communication. Table 3 is merely an example, and the operating band used for V2X (or SL) communication may also include examples described in Tables 4 to 6 to be described later.

TABLE 3

| Operating Band | V2X Band Operating | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD(Half Duplex) | PC5 |

When the operating band 47 according to the example of Table 3 is used for E-UTRA V2X (or SL) communication, the operating band 47 may be referred to as B47. When the operating band 47 according to the example of Table 3 is used for NR V2X (or SL) communication, the operating band 47 may also be referred to as n47. For reference, at least one method proposed according to various embodiments of the disclosure of the present specification may be applied not only to sidelink communication or V2X communication based on a PC5 interface or an SL interface (e.g., PSCCH, PSSCH, PSBCH, PSSS/SSSS, etc.) but also to sidelink communication or V2X communication based on a Uu interface (e.g., PUSCH, PDSCH, PDCCH, PUCCH, etc.).

In various embodiments of the disclosure of the present specification, a receiving operation of a UE may include a decoding operation and/or receiving operation of a sidelink channel and/or sidelink signal (e.g., PSCCH, PSSCH, PSFCH, PSBCH, PSSS/SSSS, etc.). In various embodiments of the disclosure of the present specification, a transmitting operation of the UE may include a transmitting operation of a sidelink channel and/or a sidelink signal (e.g., PSCCH, PSSCH, PSFCH, PSBCH, PSSS/SSSS. etc.).

In various embodiments of the disclosure of the present specification, for example, a (physical) channel used for an RX UE to transmit at least one of the following pieces of information to a TX UE may be referred to as a PSFCH, for convenience of description.

SL HARQ feedback, SL CSI, and SL (L1) RSRP

In various embodiments of the disclosure of the present specification, Uu channels may include UL channels and/or DL channels. For example, the UL channels may include a PUSCH, a PUCCH, and so on. For example, the DL channels may include a PDCCH, a PDSCH, and so on. For example, SL channels may include a PSCCH, a PSSCH, a PSFCH, a PSBCH, and so on.

II. Disclosure of Present Specification

The disclosures described below in the present specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may include a combination of one or more operations/configurations/stages described below. The following methods described below may be performed or used in combination or complementarily.

The UE may support both NR V2X SL of the same frequency band and LTE V2X SL of the same frequency band. For example, the UE may support both NR V2X SL communication and LTE V2X SL communication by RF switching between NR V2X SL and LTE V2X SL of the same frequency band in a Time Division Multiplexing (TDM) manner Conventionally, when the UE performs RF switching between NR V2X SL communication and LTE V2X SL communication, there was no discussion about how it affects Uu communication (e.g., LTE Uu communication or NR Uu communication) performed by the UE. Accordingly, conventionally, when the UE supports all of NR V2X SL communication, LTE V2X SL communication, and Uu communication, there was no way for effectively supporting Uu communication when RF switching between NR V2X SL communication and LTE V2X SL communication was performed.

The disclosure of the present specification discusses interruption in Uu communication that occurs due to RF switching when the UE performs communication by RF switching NR V2X SL and LTE V2X SL of the same frequency band in a TDM (Time Division Multiplexing) manner (TDM-ed manner), RF switching occurs due to Interruptions in Uu communication, and explains techniques related to such interruptions.

For reference, in the disclosure of the present specification, the sidelink (SL), V2X, and V2X sidelink (SL) may be used as the same meaning.

For reference, the Uu link (or interface) may refer to an interface for communication between a UE and a base station. The PC5 link (or interface) may refer to an interface for communication between the UE and another UE.

In NR, a UE supporting V2X (hereinafter, also referred to as a V2X UE) may also support all of Uu communication (UL communication and DL communication with the network), LTE V2X SL communication, and NR V2X SL communication. For example, the V2X UE may support a combination of NR Uu band+NR V2X SL band+LTE V2X SL band. For example, the V2X UE may support the band combination V2X_(n) 47_n71 in the example of Table 4 below.

TABLE 4

| E-UTRA-NR V2X Band Combination | E-UTRA or NR Band | Interface |
| --- | --- | --- |
| V2X_20_n38 | 20 | Uu |
|  | n38 | PC5 |
| V2X_47_n71 | 47 | PC5 |
|  | n71 | Uu |
| V2X_(n) 47_n71 | 47 | PC5 |
|  | n47 | PC5 |
|  | n71 | Uu |

For reference, in the band combination V2X_(n)47_n71, (n)47 may be an ITS band. Here, the ITS may be an Intelligent Transport System (ITS). The example of Table 4 shows an example of a band combination supported by the V2X UE. For example, in the band combination V2X_(n) 47_n71, it may mean that the V2X UE performs LTE V2X SL communication based on band 47, performs NR V2X SL communication based on band n47, and performs NR Uu communication based on band n71. Band n47, band 47, and band n71 shown in the example of Table 4 may be specifically defined as in the example of Table 5 and the example of Table 6 below.

TABLE 5

| NR operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
| --- | --- | --- | --- |
| n47 | 5866 MHz-5925 MHz | 5866 MHz-5925 MHz | HD |
| n71 | 663 MHz-698 MHz | 617 MHz-652 MHZ | FDD |

The example of Table 5 shows the NR operating bands n47 and n71.

TABLE 6

| E-UTRA (LTE) operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
| --- | --- | --- | --- |
| 47 | 5866 MHz-5925 MHz | 5866 MHz-5925 MHz | HD |

The example of Table 6 shows E-UTRA (LTE) operating band 47.

As in the example of the UE supporting the band combination V2X_(n)47_n71, the UE may support NR uplink/downlink (Uu) in the licensed band (n71), and may support both NR V2X SL and LTE V2X SL of the ITS band (e.g., band 47 (B47), band n47 (n47)). Such a UE may support NR uplink/downlink (Uu) in the licensed band (n71), and may support both NR V2X SL communication and LTE V2X SL communication in a time division manner through RF switching in ITS bands (47, n47). In case of such a UE, when ITS band RF switching is performed (e.g., switching from LTE V2X SL communication to NR V2X SL communication or NR V2X SL communication to LTE V2X SL communication), interruption for NR Uu may occur. In the disclosure of the present specification, interruption generated due to RF switching of a UE supporting both NR V2X SL communication and LTE V2X SL communication will be described in detail. As an example, the number of slots (e.g., interrupted slots) affected by such interruption will be discussed. For example, slots affected by interruption may vary according to subcarrier spacing (SCS). As an example, the number of interrupted slots may vary according to the synchronization source reference and/or SCS of V2X SL.

LTE V2X SL communication and NR V2X SL communication are defined as being able to be performed in a 5.9 GHz band (e.g., band 47, band n47). The UE may support both LTE V2X SL communication and NR V2X SL communication by using the same RF. For example, among UEs supporting V2X communication, a UE capable of supporting both LTE V2X SL communication and NR V2X SL communication, and a UE capable of supporting only one of NR V2X SL communication or LTE V2X SL communication may exist. Accordingly, capability signaling for distinguishing between a UE capable of supporting both LTE V2X SL communication and NR V2X SL communication and a UE capable of supporting one of LTE V2X SL communication and NR V2X SL communication may be required. Additionally, among UEs supporting V2X communication as in the example described above, signaling (e.g., capability signaling) for distinguishing a UE capable of supporting NR Uu communication and/or LTE Uu communication together may be required.

In the disclosure of the present specification, such capability signaling is proposed. Examples of proposals for capability signaling in the disclosure of the present specification are the same as Signaling 1 and Signaling 2 below:

Signaling 1: By using the same RF, LTE V2X SL communication and NR V2X communication are supported in a TDM manner, and capability signaling for a UE capable of supporting NR Uu is defined.

Signaling 2: By using the same RF, LTE V2X SL communication and NR V2X communication are supported in a TDM manner, and capability signaling for a UE capable of supporting LTE Uu is defined.

Hereinafter, with reference to FIG. 7, an example of capability signaling to transmit Signaling 1 or Signaling 2 described above to a base station will be described. In other words, an example of capability signaling according to an embodiment of the disclosure of the present specification will be described below with reference to FIG. 7.

The following drawings are prepared to explain a specific example of the present specification. Since the names of specific devices described in the drawings or the names of specific signals/messages/fields are presented by way of example, the technical features of the present specification are not limited to the specific names used in the following drawings.

Figure 7:
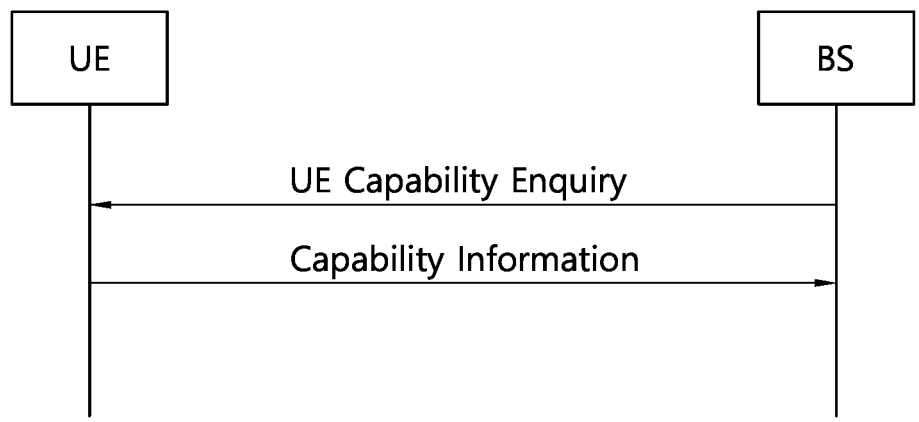
FIG. 7 shows an example of capability signaling according to the disclosure of the present specification.

FIG. 7 shows an example of capability signaling according to the disclosure of the present specification.

Referring to FIG. 7, an example of capability signaling according to the disclosure of the present specification is shown. The example of the capability signaling of FIG. 7 is merely an example, and the scope of the disclosure of the present specification maya include any signaling informing whether a UE may support both LTE V2X and NR V2X to a base station and/or any signaling informing whether a UE may support LTE V2X SL communication and NR V2X communication together with LTE Uu communication or NR Uu communication to a base station.

A base station (e.g., gNB or eNB, etc.) may transmit a UE capability enquiry message to a terminal (e.g., UE). The UE capability enquiry message transmitted by the base station may be a message for inquiring whether the UE may support both LTE V2X and NR V2X. In addition, the UE capability enquiry message may be a message for inquiring whether the UE may support LTE V2X SL communication and NR V2X communication in a TDM manner using the same RF and support NR Uu. In addition, the UE capability enquiry message may be a message for inquiring whether the UE may support LTE V2X SL communication and NR V2X communication in a TDM manner using the same RF and support LTE Uu.

A UE may transmit capability information to a base station. The capability information may include information on whether the UE may support both LTE V2X and NR V2X. For example, the capability information may include information on whether the UE may support both LTE V2X communication and NR V2X communication by using the same RF. For another example, the capability information may also include information related to Signaling 1 or information related to Signaling 2 described above. Specifically, the capability information may include information on whether the UE may support LTE V2X SL communication and NR V2X communication in a TDM manner using the same RF and support NR Uu. The capability information may also include information on whether the UE may support LTE V2X SL communication and NR V2X communication in a TDM manner using the same RF, and support LTE Uu.

When the UE capability enquiry message is received, the UE may transmit capability information to a base station. Alternatively, the transmission of the UE capability enquiry message by the base station may also be omitted, and the UE may transmit the capability information to the base station even when the UE capability enquiry message is not received.

Hereinafter, a technology related to interruption of a UE supporting both LTE V2X SL communication and NR V2X SL communication in a TDM manner will be described. For example, when such a UE switches from LTE V2X SL communication to NR V2X SL communication, or when a UE switches from NR V2X SL communication to LTE V2X SL communication, RF switching time may be required. A technology related to interruption generated for the NR Uu and/or the interruption generated for the LTE Uu of the UE due to this RF switching time will be described.

In the case of NR V2X communication, 15 kHz, 30 kHz, and 60 kHz are defined for SCS (Subcarrier Spacing) in FR1 (Frequency Range1: 410 MHz to 7125 MHz). In FR2 (Frequency Range2: 24250 MHz-52600 MHz), 60 kHz and 120 kHz are defined for SCS.

In the case of LTE V2X communication, the SCS is defined only as a single SCS 15 kHz.

Hereinafter, interruption related to FR1 sharing a frequency with LTE V2X will be mainly described.

When a UE supporting both LTE V2X SL communication and NR V2X SL communication performs RF switching (e.g., switching from LTE V2X SL communication to NR V2X SL communication, NR V2X SL communication to LTE V2X SL communication), RF switching time may be applied.

For example, the RF switching time may be considered based on an RF retuning time (Local Oscillator (LO) frequency retuning time+RF chain reconfiguration time) and a transient period defined in a standard document. Here, the LO frequency retuning time may mean the time required to switch from the LTE V2X carrier frequency to the NR V2X carrier frequency, or the time required to be switched in vice versa (e.g., switching from the NR V2X carrier frequency to the LTE V2X carrier frequency). The RF chain reconfiguration time may mean the time required to switch the RF chain environment setting from LTE V2X to NR V2X or from NR V2X to LTE V2X. The transient period may mean the time required to switch LTE V2X RF from On→Off and NR V2X RF from Off→On when it is switched from LTE V2X to NR V2X, or vice versa, may mean the time required to switch NR V2X RF from On→Off and LTE V2X RF from Off→On when it is switched from NR V2X to LTE V2X. For example, in the disclosure of the present specification, the RF switching time may be defined as follows.

RF Switching time=LTE V2X transient period+RF retuning time+NR V2X transient period.

LTE V2X transient period=20 us

NR V2X transient period=10 us

RF retuning time (Example: 120 us~210 us (FR1))

In other words, the RF Switching time may be defined as the sum of the LTE V2X transient period, the RF retuning time, and the NR V2X transient period. LTE V2X transient period may be 20 us. The NR V2X transient period may be 10 us. RF retuning time in FR1 may be 120 us to 210 us.

Based on the example described above, in the ITS band (e.g., B47, n47), it may be assumed that the range of the switching time between the LTE SL and the NR SL is 140 us to 210 us. For example, in the ITS band (e.g., B47, n47), the candidate switching times between the LTE SL and the NR SL may be 140 us, 150 us, and 210 us.

It is assumed that RF switching between LTE SL and NR SL (e.g., switching from LTE V2X SL communication to NR V2X SL communication, or switching from NR V2X SL communication to LTE V2X SL communication) occurs at a slot boundary in the NR SL reference, and occurs at a subframe boundary in the LTE SL reference. For example, a UE supporting both LTE V2X SL communication and NR V2X SL communication may perform RF switching (e.g., switching from LTE V2X SL communication to NR V2X SL communication, or switching from NR V2X SL communication to LTE V2X SL communication) at a slot boundary in the NR SL reference and at a subframe boundary in the LTE SL reference.

Hereinafter, the number of interrupted slots according to RF switching will be described in detail. Based on the example in which a UE supports NR Uu, NR SL and LTE SL and the example in which a UE supports LTE Uu, NR SL and LTE SL, the number of interrupted slots according to RF switching will be described in detail.

First, in the disclosure of the present specification, RF switching and an interrupted slot according to RF switching will be specifically described focusing on an example in which a UE supports NR Uu, NR SL, and LTE SL.

Hereinafter, an example in which a UE supports NR Uu, NR SL, and LTE SL will be described.

First, an example (e.g., synchronous operation) when synchronization between NR Uu communication and V2X SL communication (NR SL communication and LTE SL communication) matches will be described. In other words, an example in which NR Uu communication and V2X SL communication (NR SL communication and LTE SL communication) are synchronized will be described. For example, when a synchronization reference source for SL communication is a gNB, it may be assumed that synchronization between NR Uu communication and V2X SL communication matches. In this case, considering the RF switching time of 140 to 210 us, the number of interrupted slots for NR Uu may be analyzed as shown in the example of FIG. 8 below.

The following drawings are prepared to explain a specific example of the present specification. Since the names of specific devices described in the drawings or the names of specific signals/messages/fields are presented by way of example, the technical features of the present specification are not limited to the specific names used in the following drawings.

Figure 8:
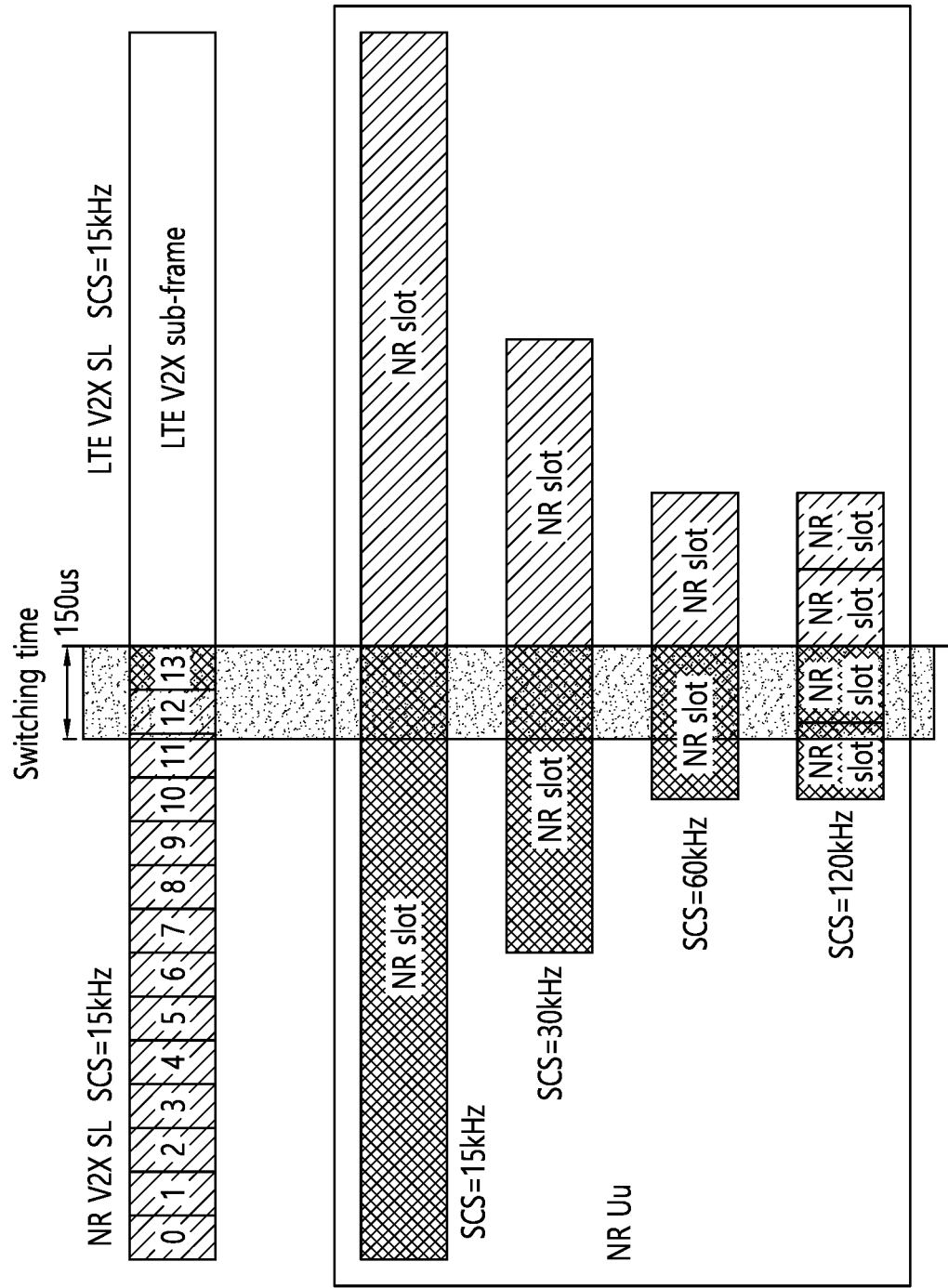
FIG. 8 shows an example of interruption in a synchronization case according to one embodiment of the disclosure of the present specification.

FIG. 8 shows an example of interruption in a synchronization case according to one embodiment of the disclosure of the present specification.

FIG. 8 shows an example of interruption duration in an NR uplink and an NR downlink since a UE performs switching between NR SL and LTE SL in a synchronization case (when NR Uu communication and V2X SL communication (NR SL communication and LTE SL communication) are synchronized).

In the example of FIG. 8, 150 us was used as an example of the RF switching time. The RF switching time of 150 us is merely an example, and within the scope of the disclosure of the present specification, the RF switching time may be any value within the range of 140 to 210 us.

In the example of FIG. 8, in a situation where SCS=15 kHz, a UE may perform NR V2X SL communication while switching to LTE V2X SL. In the example of FIG. 8, based on the slot boundary of NR V2X SL, an RF switching time of 150 us may be applied to the UE.

According to an example in which the SCS shown in FIG. 8 is 15 kHz, 30 kHz, 60 kHz, and 120 kHz, the number of NR slots in which interruption occurs due to the RF switching time may be as follows. For example, when the SCS is 15 kHz, the number of interrupted slots may be 1. When the SCS is 30 kHz, the number of interrupted slots may be 1. When the SCS is 60 kHz, the number of interrupted slots may be 1. When the SCS is 120 kHz, the number of interrupted slots may be two.

As described with reference to the example of FIG. 8, the number of interrupted slots is suggested as shown in the example of Table 7 below.

TABLE 7

| μ | NR Slot length (ms) | Interruption length (slots) |
|---|---|---|
| 0 | 1 | 1 |
| 1 | 0.5 | 1 |
| 2 | 0.25 | 1 |
| 3 | 0.125 | 2 |

Table 7 shows an example of interruption duration in an NR uplink and an NR downlink since a UE performs switching between NR SL and LTE SL in a synchronization case (when NR Uu communication and V2X SL communication (NR SL communication and LTE SL communication) are synchronized). In Table 7, μ=0 may mean SCS=15 kHz. μ=1 may mean SCS=30 kHz. μ=2 may mean SCS=60 kHz. μ=3 may mean SCS=120 kHz.

In the synchronization case (when NR Uu communication and V2X SL communication (NR SL communication and LTE SL communication) are synchronized), when a UE performs switching between NR SL and LTE SL, interruption may be applied as many as the number of slots shown in the example of Table 7.

For example, according to Table 7, in the case where SCS=15 kHz, when a UE performs switching between NR SL and LTE SL, one interrupted slot may exist for NR Uu communication. In the case where SCS=30 kHz, when the UE performs switching between NR SL and LTE SL, one interrupted slot may exist for NR Uu communication. In the case where SCS=60 kHz, when the UE performs switching between NR SL and LTE SL, one interrupted slot may exist for NR Uu communication. In the case where SCS=120 kHz, when the UE performs switching between NR SL and LTE SL, two interrupted slots may exist for NR Uu communication.

The UE and/or the network may know that interruption exists for NR Uu communication (NR uplink communication and NR downlink communication) in the interrupted slot according to the example of Table 7.

Hereinafter, an example (e.g., asynchronous operation) when synchronization between NR Uu communication and V2X SL communication (NR SL communication and LTE SL communication) does not match will be described. In other words, an example of a case in which NR Uu communication and V2X SL communication (NR SL communication and LTE SL communication) are not synchronized will be described. For example, when a synchronization reference source for SL communication is a Global Navigation Satellite System (GNSS), it may be assumed that synchronization between NR Uu communication and V2X SL communication does not match. In this case, considering the RF switching time of 140 to 210 us, the number of interrupted slots for NR Uu may be analyzed as shown in the example of FIG. 9 below.

The following drawings are prepared to explain a specific example of the present specification. Since the names of specific devices described in the drawings or the names of specific signals/messages/fields are presented by way of example, the technical features of the present specification are not limited to the specific names used in the following drawings.

Figure 9:
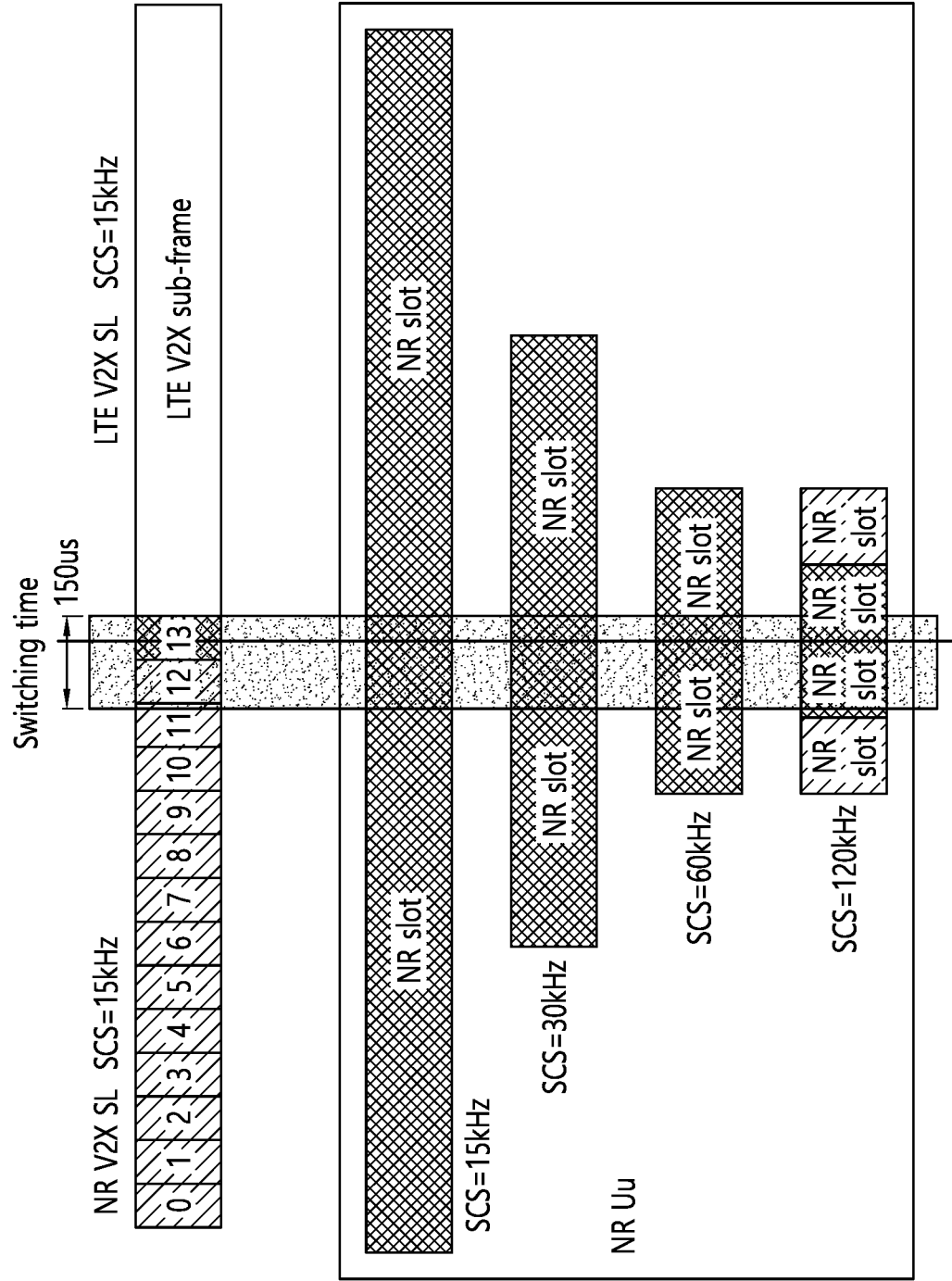
FIG. 9 shows an example of interruption in an unsynchronized case according to one embodiment of the disclosure of the present specification.

FIG. 9 shows an example of interruption in an unsynchronized case according to one embodiment of the disclosure of the present specification.

FIG. 9 shows an example of interruption duration in an NR uplink and an NR downlink since a UE performs switching between NR SL and LTE SL in an asynchronization case (when NR Uu communication and V2X SL communication (NR SL communication and LTE SL communication) are not synchronized). Unlike the example of FIG. 8 in which the slot boundary in V2X communication and the slot boundary in Uu communication match, referring to the example of FIG. 9, the slot boundary in V2X communication and the slot boundary in Uu communication do not match.

In the example of FIG. 9, 150 us was used as an example of the RF switching time. The RF switching time of 150 us is merely an example, and within the scope of the disclosure of the present specification, the RF switching time may be any value within the range of 140 to 210 us.

In the example of FIG. 9, in a situation where SCS=15 kHz, a UE may perform NR V2X SL communication while switching to LTE V2X SL. In the example of FIG. 9, based on the slot boundary of NR V2X SL, an RF switching time of 150 us may be applied to the UE.

According to an example in which the SCS shown in FIG. 9 is 15 kHz, 30 kHz, 60 kHz, and 120 kHz, the number of NR slots in which interruption occurs due to the RF switching time may be as follows. For example, when the SCS is 15 kHz, the number of interrupted slots may be two. When the SCS is 30 kHz, the number of interrupted slots may be two. When the SCS is 60 kHz, the number of interrupted slots may be two. When the SCS is 120 kHz, the number of interrupted slots may be two.

As described with reference to the example of FIG. 9, the number of interrupted slots is suggested as shown in the example of Table 8 below.

TABLE 8

| μ | NR Slot length (ms) | Interruption length (slots) |
|---|---|---|
| 0 | 1 | 2 |
| 1 | 0.5 | 2 |
| 2 | 0.25 | 2 |
| 3 | 0.125 | 2 |

Table 8 shows an example of interruption duration in an NR uplink and an NR downlink since a UE performs switching between NR SL and LTE SL in an asynchronization case (when NR Uu communication and V2X SL communication (NR SL communication and LTE SL communication) are not synchronized).

In Table 8, μ=0 may mean SCS=15 kHz. μ=1 may mean SCS=30 kHz. μ=2 may mean SCS=60 kHz. μ=3 may mean SCS=120 kHz.

In the asynchronization case (when NR Uu communication and V2X SL communication (NR SL communication and LTE SL communication) are not synchronized), when a UE performs switching between NR SL and LTE SL, interruption may be applied as many as the number of slots shown in the example of Table 8.

For example, according to Table 8, in the case where SCS=15 kHz, when a UE performs switching between NR SL and LTE SL, two interrupted slots may exist for NR Uu communication. In the case where SCS=30 kHz, when the UE performs switching between NR SL and LTE SL, two interrupted slots may exist for NR Uu communication. In the case where SCS=60 kHz, when the UE performs switching between NR SL and LTE SL, two interrupted slots may exist for NR Uu communication. In the case where SCS=120 kHz, when the UE performs switching between NR SL and LTE SL, two interrupted slots may exist for NR Uu communication.

The UE and/or the network may know that interruption exists for NR Uu communication (NR uplink communication and NR downlink communication) in the interrupted slot according to the example of Table 8.

With reference to the example of FIG. 8 and the example of Table 7, an example of a case in which NR Uu communication and V2X SL communication (NR SL communication and LTE SL communication) are synchronized has been described. With reference to the example of FIG. 9 and the example of FIG. 8, an example of a case in which NR Uu communication and V2X SL communication (NR SL communication and LTE SL communication) are not synchronized has been described.

For example, a UE and/or network may apply the interrupted slot according to the example of Table 7 when NR Uu communication and V2X SL communication (NR SL communication and LTE SL communication) are synchronized, and may also apply the interrupted slot according to the example of Table 8 when NR Uu communication and V2X SL communication (NR SL communication and LTE SL communication) are not synchronized.

For another example, a UE and/or network may also apply the interrupted slot according to the example of Table 8 without considering whether NR Uu communication and V2X SL communication (NR SL communication and LTE SL communication) are synchronized. For example, comparing the case where NR Uu communication and V2X SL communication (NR SL communication and LTE SL communication) are synchronized with the case where NR Uu communication and V2X SL communication (NR SL communication and LTE SL communication) are not synchronized, a case in which NR Uu communication and V2X SL communication (NR SL communication and LTE SL communication) are not synchronized may correspond to the worst case. Accordingly, the number of interrupted slots when the worst case that NR Uu communication and V2X SL communication (NR SL communication and LTE SL communication) are not synchronized may also be applied by the UE and/or the network.

As in the example described above, a UE and/or network may also apply the interrupted slot according to the example of Table 8 without considering whether NR Uu communication and V2X SL communication (NR SL communication and LTE SL communication) are synchronized. In this case, in the example of Table 8, the number of interrupted slots in the case where SCS=120 kHz may be two. For example, when SCS=120 kHz and the UE performs switching between NR SL and LTE SL, for NR Uu communication, two interrupted slots may exist.

Hereinafter, various examples of when NR Uu communication and V2X SL communication (NR SL communication and LTE SL communication) are synchronized and various examples of when NR Uu communication and V2X SL communication (NR SL communication and LTE SL communication) are not synchronized will be described. In addition, an example of the number of interrupted slots applied in each example will be described.

i) When the synchronization reference source for SL communication is a SyncRef UE (e.g., when another UE is a synchronization reference source of the UE), and when the SyncRef UE is directly or indirectly synchronized with gNB, it may be assumed that the synchronization between NR Uu communication and V2X SL communication matches. In this case, the UE may apply the interrupted slot according to the example of Table 7. Alternatively, as described above, the UE may also apply the interrupted slot according to the example of Table 7 without considering whether NR Uu communication and V2X SL communication (NR SL communication and LTE SL communication) are synchronized. In this case, the UE may also apply two interrupted slots for NR Uu communication when SCS=120 kHz.

ii) When the synchronization reference source for SL communication is a SyncRef UE (e.g., when another UE is a synchronization reference source of the UE), and when the SyncRef UE is directly or indirectly synchronized with GNSS, it may be assumed that the synchronization between NR Uu communication and V2X SL communication does not match. In this case, the UE may apply the interrupted slot according to the example of Table 8. Alternatively, as described above, the UE may also apply the interrupted slot according to the example of Table 8 without considering whether NR Uu communication and V2X SL communication (NR SL communication and LTE SL communication) are synchronized. In this case, the UE may also apply two interrupted slots for NR Uu communication when SCS=120 kHz.

iii) When the synchronization reference source for SL communication is a SyncRef UE (e.g., when another UE is a synchronization reference source of the UE), and when the SyncRef UE is the synchronization reference source with the lowest priority, it may be assumed that the synchronization between NR Uu communication and V2X SL communication does not match. In this case, the UE may apply the interrupted slot according to the example of Table 8. Alternatively, as described above, the UE may also apply the interrupted slot according to the example of Table 8 without considering whether NR Uu communication and V2X SL communication (NR SL communication and LTE SL communication) are synchronized. In this case, the UE may also apply two interrupted slots for NR Uu communication when SCS=120 kHz.

iv) When the synchronization reference source for SL communication is a SyncRef UE (e.g., when another UE is a synchronization reference source of the UE), the UE may not know whether the SyncRef UE is synchronized based on which one of gNB, GNSS, or lowest priority (e.g., self-synchronization). For example, the UE may not know on which basis the SyncRef UE sets the synchronizing signal. In this case, it may be assumed that the synchronization between NR Uu communication and V2X SL communication does not match. Accordingly, the UE may apply the interrupted slot according to the example of Table 8. Alternatively, as described above, the UE may also apply the interrupted slot according to the example of Table 8 without considering whether NR Uu communication and V2X SL communication (NR SL communication and LTE SL communication) are synchronized. In this case, the UE may also apply two interrupted slots for NR Uu communication when SCS=120 kHz.

A network (e.g., gNB) that controls (or manages) the NR Uu service needs to recognize the number of interrupted slots proposed in the various examples above in order to perform normal scheduling. The network (e.g., gNB) may perform scheduling for NR Uu communication with a UE based on the number of interrupted slots. For example, the network (e.g., gNB) may schedule so that transmission of downlink data and transmission of uplink data are not performed in the interrupted slot.

In order for the network (e.g., gNB) to recognize the number of interrupted slots, the network (e.g., gNB) needs to recognize information related to the synchronization reference source being used in the V2X SL communication of a UE. For example, the network (e.g., gNB) provides information related to the synchronization reference source to be used in V2X SL communication to the UE, so that the network (e.g., gNB) may recognize information related to the synchronization reference source being used in the V2X SL communication of the UE. As another example, by providing information related to the synchronization reference source used in the V2X SL communication by the UE to the network (e.g., gNB), the network (e.g., gNB) may recognize information related to the synchronization reference source being used in the V2X SL communication of the UE.

The network (e.g., gNB) may perform scheduling for NR Uu communication with the UE based on the number of interrupted slots. For example, when NR Uu communication and V2X SL communication (NR SL communication and LTE SL communication) are synchronized, the network may apply an interrupted slot according to the example of Table 7 to perform scheduling for NR Uu communication. For example, when NR Uu communication and V2X SL communication (NR SL communication and LTE SL communication) are not synchronized, the network may apply an interrupted slot according to the example of Table 8 to perform scheduling for NR Uu communication. For another example, the network may apply an interrupted slot according to the example of Table 8 to perform scheduling for NR Uu communication, without considering whether NR Uu communication and V2X SL communication (NR SL communication and LTE SL communication) are synchronized. In this case, the network may perform scheduling for NR Uu communication by applying that the number of interrupted slots is 2 when SCS=120 kHz.

For example, the network (e.g., gNB) may apply the number of interrupted slots according to the following various examples.

As an example, there may be a case where the network (e.g., gNB) may not know information related to the synchronization reference source being used in the V2X SL communication of the UE. In this case, since it may be assumed that the V2X SL communication and the NR Uu communication are not synchronized, the network (e.g., gNB) may apply an interrupted slot according to the example of Table 8. For example, the network (e.g., gNB) may apply an interrupted slot according to the example of Table 8 to perform scheduling for NR Uu communication.

As another example, regardless of whether the network (e.g., gNB) knows or does not know information related to the synchronization reference source being used in V2X SL communication of the UE, the network (e.g., gNB) may also apply the same number of interrupted slots. In this case, the network (e.g., gNB) may assume that V2X SL communication and NR Uu communication are not synchronized, and the network (e.g., gNB) may apply an interrupted slot according to the example in Table 8. For example, the network (e.g., gNB) may apply an interrupted slot according to the example of Table 8 to perform scheduling for NR Uu communication.

Frequent switching of NR V2X SL and LTE V2X SL may give frequent interruption to NR Uu. Accordingly, in order to guarantee an NR Uu service to a certain level or more, NR V2X SL and LTE V2X SL switching may be limited to some extent. For example, the disclosure of the present specification proposes a method for the UE to perform semi-persistant SL switching and/or a method for setting the ACK/NACK miss probability of NR Uu due to interruption at a level of 0.5% to 5%. As an example, when the ACK/NACK miss probability of NR Uu is limited to 0.5%, the following content is proposed:

Interruptions on NR Uu due to switching between NR SL and LTE SL are allowed with up to 0.5% probability of missed Acknowledgement (ACK)/Non-Acknowledgement (NACK). For example, due to the switching between the NR SL and the LTE SL, switching between the NR SL and the LTE SL may be limited so that the probability that the UE and/or the network misses the ACK/NACK in the NR Uu communication of the UE is up to 0.5%. In other words, the SL scheduling of the UE may be limited to satisfy this requirement. For a specific example, in a section in which the UE performs DL communication or UL communication through NR Uu, the UE may perform only one of NR V2X SL communication and LTE V2X SL communication. Alternatively, in a section in which there is no DL slot or UL slot, the UE may perform RF switching between NR V2X SL and LTE V2X SL. Alternatively, the SL RF switching of the UE may be limited to ($5/1000$)*n times or less based on n (n is an arbitrary positive integer) slots of the DL operation section or the UL operation section of Uu. For example, in the case where Uu SCS=15 kHz (slot length=1 ms), when the DL operation section or UL operation section is 1 second, the number of SL RF switching of the UE may be limited to 5 or less during 1 second.

In the various examples described above, RF switching and interrupted slots according to RF switching have been specifically described, focusing on an example in which the UE supports NR Uu, NR SL, and LTE SL. Hereinafter, with reference to the various examples described above, RF switching for a case in which the UE supports LTE Uu, NR SL and LTE SL and interrupted slots according to RF switching will be described in detail.

For LTE Uu communication, an SCS of 15 kHz is used, and an LTE subframe with a length of 1 ms is used. For example, when an interrupted slot of LTE Uu communication is described with reference to the example of FIG. 8, interruption may be applied to an LTE subframe of LTE Uu communication in the same manner as an NR slot with SCS=15 kHz in a synchronization case. For example, in this case, the number of interrupted subframes may be one. Similarly, when the interrupted slot of LTE Uu communication is described with reference to the example of FIG. 9, interruption may be applied to the LTE subframe of LTE Uu communication in the same manner as the NR slot with SCS=15 kHz in the unsynchronized case. For example, in this case, the number of interrupted subframes may be two.

When the UE supports LTE Uu, NR SL and LTE SL, the UE and/or the network may apply an interrupted subframe as in the following example. For example, when LTE Uu communication and V2X SL communication (NR SL communication and LTE SL communication) are synchronized, the UE and/or network may apply one interrupted subframe. When LTE Uu communication and V2X SL communication (NR SL communication and LTE SL communication) are not synchronized, the UE and/or the network may apply two interrupted subframes. For another example, the UE and/or the network may also apply two interrupted subframes without considering whether LTE Uu communication and V2X SL communication (NR SL communication and LTE SL communication) are synchronized.

Hereinafter, for UEs supporting LTE Uu, NR SL and LTE SL, various examples of when NR Uu communication and V2X SL communication (NR SL communication and LTE SL communication) are synchronized and various examples of when NR Uu communication and V2X SL communication (NR SL communication and LTE SL communication) are not synchronized will be described. In addition, an example of the number of interrupted slots applied in each example will be described.

i) When a synchronization reference source for SL communication is an eNB, it may be assumed that synchronization between LTE Uu communication and V2X SL communication matches. In this case, the UE may apply one interrupted subframe. Alternatively, as described above, the UE may also apply two interrupted subframes without considering whether LTE Uu communication and V2X SL communication (NR SL communication and LTE SL communication) are synchronized.

ii) When the synchronization reference source for SL communication is a GNSS, it may be assumed that the synchronization between LTE Uu communication and V2X SL communication does not match. In this case, the UE may apply two interrupted subframes.

iii) When the synchronization reference source for SL communication is an SyncRef UE (e.g., when another UE is a synchronization reference source of the UE), in the case where the SyncRef UE is directly or indirectly synchronized with the gNB, it may be assumed that the synchronization between LTE Uu communication and V2X SL communication matches. In this case, the UE may apply one interrupted subframe. Alternatively, as described above, the UE may also apply two interrupted subframes without considering whether LTE Uu communication and V2X SL communication (NR SL communication and LTE SL communication) are synchronized.

iv) When the synchronization reference source for SL communication is a SyncRef UE (e.g., when another UE is a synchronization reference source of the UE), in the case where the SyncRef UE is directly or indirectly synchronized with the GNSS, it may be assumed that the synchronization between LTE Uu communication and V2X SL communication does not match. In this case, the UE may apply two interrupted subframes.

v) When the synchronization reference source for SL communication is an SyncRef UE (e.g., when another UE is a synchronization reference source of the UE), in the case where the SyncRef UE is a synchronization reference source having the lowest priority, it may be assumed that the synchronization between LTE Uu communication V2X SL communication does not match. In this case, the UE may apply two interrupted subframes.

vi) When the synchronization reference source for SL communication is an SyncRef UE (e.g., when another UE is a synchronization reference source of the UE), the UE may not know whether the SyncRef UE is synchronized based on which of gNB, GNSS, or lowest priority (e.g., self-synchronization). For example, the UE may not know on which basis the SyncRef UE sets the synchronization signal. In this case, it may be assumed that the synchronization between LTE Uu communication and V2X SL communication does not match. In this case, the UE may apply two interrupted subframes.

A network (e.g., gNB) that controls (or manages) the LTE Uu service needs to recognize the number of interrupted subframes proposed in the various examples above in order to perform normal scheduling. The network (e.g., gNB) may perform scheduling for LTE Uu communication with a UE based on the number of interrupted subframes. For example, the network (e.g., gNB) may schedule so that transmission of downlink data and transmission of uplink data are not performed in the interrupted subframe.

In order for the network (e.g., gNB) to recognize the number of interrupted subframes, the network (e.g., gNB) needs to recognize information related to the synchronization reference source being used in the V2X SL communication of a UE. For example, the network (e.g., gNB) provides information related to the synchronization reference source to be used in V2X SL communication to the UE, so that the network (e.g., gNB) may recognize information related to the synchronization reference source being used in the V2X SL communication of the UE. As another example, by providing information related to the synchronization reference source used in the V2X SL communication by the UE to the network (e.g., gNB), the network (e.g., gNB) may recognize information related to the synchronization reference source being used in the V2X SL communication of the UE.

The network (e.g., gNB) may perform scheduling for LTE Uu communication with the UE based on the number of interrupted slots. For example, when LTE Uu communication and V2X SL communication (NR SL communication and LTE SL communication) are synchronized, the network may apply one interrupted subframe to perform scheduling for LTE Uu communication. For example, when LTE Uu communication and V2X SL communication (NR SL communication and LTE SL communication) are not synchronized, the network may apply two interrupted subframes to perform scheduling for LTE Uu communication. For another example, the network may apply two interrupted subframes to perform scheduling for LTE Uu communication, without considering whether LTE Uu communication and V2X SL communication (NR SL communication and LTE SL communication) are synchronized.

For example, the network (e.g., gNB) may apply the number of interrupted slots according to the following various examples.

As an example, there may be a case where the network (e.g., gNB) may not know information related to the synchronization reference source being used in the V2X SL communication of the UE. In this case, since it may be assumed that the V2X SL communication and the LTE Uu communication are not synchronized, the network (e.g., gNB) may apply two interrupted subframes. For example, the network (e.g., gNB) may apply two interrupted subframes to perform scheduling for LTE Uu communication.

As another example, regardless of whether the network (e.g., gNB) knows or does not know information related to the synchronization reference source being used in V2X SL communication of the UE, the network (e.g., gNB) may also apply the same number of interrupted subframes. In this case, the network (e.g., gNB) may assume that V2X SL communication and LTE Uu communication are not synchronized, and the network (e.g., gNB) may apply two interrupted subframes. For example, the network (e.g., gNB) may apply two interrupted subframes to perform scheduling for LTE Uu communication.

Frequent switching of NR V2X SL and LTE V2X SL may give frequent interruption to LTE Uu. Accordingly, in order to guarantee an LTE Uu service to a certain level or more, NR V2X SL and LTE V2X SL switching may be limited to some extent. For example, the disclosure of the present specification proposes a method for the UE to perform semi-persistant SL switching and/or a method for setting the ACK/NACK miss probability of LTE Uu due to interruption at a level of 0.5% to 5%. As an example, when the ACK/NACK miss probability of LTE Uu is limited to 0.5%, the following content is proposed:

Interruptions on LTE Uu due to switching between NR SL and LTE SL are allowed with up to 0.5% probability of missed ACK/NACK. For example, due to the switching between the NR SL and the LTE SL, switching between the NR SL and the LTE SL may be limited so that the probability that the UE and/or the network misses the ACK/NACK in the NR Uu communication of the UE is up to 0.5%. In other words, the SL scheduling of the UE may be limited to satisfy this requirement. For a specific example, in a section in which the UE performs DL communication or UL communication through NR Uu, the UE may perform only one of NR V2X SL communication and LTE V2X SL communication. Alternatively, in a section in which there is no DL slot or UL slot, the UE may perform RF switching between NR V2X SL and LTE V2X SL. Alternatively, the SL RF switching of the UE may be limited to $(5/1000)*n$ times or less based on n (n is an arbitrary positive integer) slots of the DL operation section or the UL operation section of Uu. For example, in the case where Uu SCS=15 kHz (slot length=1 ms), when the DL operation section or UL operation section is 1 second, the number of SL RF switching of the UE may be limited to 5 or less during 1 second.

Hereinafter, an operation of a UE according to an embodiment of the disclosure of the present specification will be described with reference to the example of FIG. 10. For reference, the operation of the UE shown in FIG. 10 is merely an example, and the UE may perform the operation of the UE according to the various examples described above.

The following drawings are prepared to explain a specific example of the present specification. Since the names of specific devices described in the drawings or the names of specific signals/messages/fields are presented by way of example, the technical features of the present specification are not limited to the specific names used in the following drawings.

Figure 10:
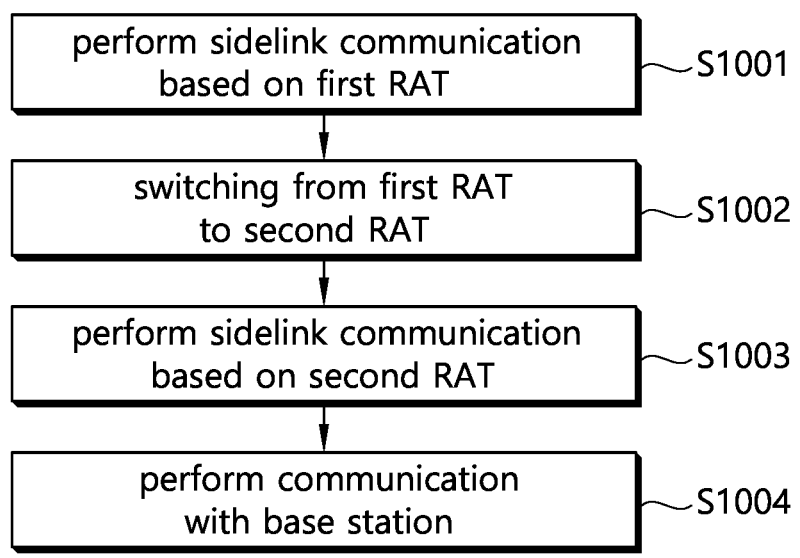
FIG. 10 shows an example of an operation of a UE according to one embodiment of the disclosure of the present specification.

FIG. 10 shows an example of an operation of a UE according to one embodiment of the disclosure of the present specification.

In S1001, the UE may perform sidelink communication based on a first RAT. Here, the first RAT may be LTE or NR.

In S1002, the UE may perform switching from the first RAT to a second RAT. Here, when the first RAT is LTE, the second RAT may be NR. When the first RAT is NR, the second RAT may be LTE. For example, the UE may perform switching from the first RAT to the second RAT in a time division multiplexing manner (TDM-ed manner).

In S1003, the UE may perform sidelink communication based on the second RAT.

In S1004, the UE may perform communication with a base station. For example, the UE may perform NR-based Uu communication or LTE-based Uu communication with the base station. In the example of FIG. 10, S1004 is shown to be performed after S1003, but this is merely an example. S1004 may be performed simultaneously while each of S1001, S1002, and S1003 is performed. For example, as described with reference to the example of FIG. 8 and the example of FIG. 9, while the UE performs sidelink communication (e.g., NR V2X SL communication) based on the first RAT (e.g., NR), while the UE performs switching from the first RAT to the second RAT, while the UE performs sidelink communication (e.g., LTE V2X SL communication) based on the second RAT (e.g., LTE), the UE may communicate with the base station.

While switching from the first RAT to the second RAT is performed, interruption for communication with the base station may be applied to a preset number of NR slots (or LTE subframes). This interruption may be applied to both downlink communication between the UE and the base station and uplink communication between the UE and the base station. For example, when the UE performs communication with the base station based on NR (e.g., when the UE performs NR Uu communication), due to switching from the first RAT to the second RAT, interruption may be applied to a preset number of NR slots according to the SCS configured for NR Uu communication.

As described above through various examples, the UE may apply an interrupted slot (or interrupted subframe). For example, the UE and/or the network may apply the interrupted slot according to the example of Table 8. In this case, in the example of Table 8, the number of interrupted slots in the case where SCS=120 kHz may be two. For example, when SCS=120 kHz and the UE performs switching between NR SL and LTE SL, for NR Uu communication, two interrupted slots may exist.

For reference, although S1001 to S1004 are illustrated in the example of FIG. 10, they are merely examples, and the UE and/or the base station may also perform the operations described with reference to the example of FIG. 7.

As described in the disclosure of the present specification, when the UE supports all of NR V2X SL communication, LTE V2X SL communication, and Uu communication, in the case where RF switching between NR V2X SL communication and LTE V2X SL communication is performed, Uu communication may be supported effectively. For example, in an example of the disclosure of the present specification, an interrupted slot or interrupted subframe due to RF switching between NR V2X SL communication and LTE V2X SL communication may be applied for Uu communication. For example, while RF switching between NR V2X SL communication and LTE V2X SL communication is performed, a UE and/or network may apply a preset number of interrupted slots or interrupted subframes to Uu communication.

For example, the UE may also assume that Uu communication is not performed for a preset number of interrupted slots or interrupted subframes. For example, the network may not schedule Uu communication with the UE for a preset number of interrupted slots or interrupted subframes.

For reference, an operation of the terminal (e.g., UE) described in the present specification may be implemented by the apparatus of FIGS. 1 to 3 described above. For example, the terminal (e.g., UE) may be the first device 100 or the second device 200 of FIG. 1. For example, an operation of the terminal (e.g., UE) described in the present specification may be processed by one or more processors 102 or 202. The operation of the UE described in the present specification may be stored in one or more memories 104 or 204 in the form of a command/program (e.g., instruction, executable code) executable by one or more processors 102 or 202. One or more processors 102 or 202 may control one or more memories 104 or 204 and one or more transceivers 106 or 206, and execute instructions/programs stored in one or more memories 104 or 204 to perform the operation of the UE (e.g., UE) described in the disclosure of the present specification.

In addition, instructions for performing an operation of a UE (e.g., UE) described in the disclosure of the present specification may also be stored in a non-volatile computer-readable storage medium in which it is recorded. The storage medium may be included in one or more memories 104 or 204. In addition, the instructions recorded in the storage medium may be executed by one or more processors 102 or 202 to perform the operation of the UE (e.g., UE) described in the disclosure of the present specification.

For reference, the operation of the base station (e.g., NG-RAN, gNB, gNB (NB-IoT), gNB (NR) eNB, RAN, etc.) described in the present specification may be implemented by the apparatuses of FIGS. 1 to 3 to be described below. For example, the base station may be a first apparatus 100*a* or a second apparatus 100*b* of FIG. 1. For example, the operation of the base station described in the present specification may be processed by one or more processors 102 or 202. The operation of the base station described in the present specification may be stored in one or more memories 104 or 204 in the form of an instruction/program (e.g., instruction, executable code) executable by one or more processors 102 or 202. One or more processors 102 or 202 may control one or more memories 104 or 204 and one or more transceivers 106 or 206, and execute instructions/programs stored in one or more memories 104 or 204 to perform the operation of the base station described in the disclosure of the present specification.

In addition, commands for performing an operation of the base station described in the disclosure of the present specification may also be stored in a non-volatile (or non-transitory) computer-readable storage medium in which it is recorded. The storage medium may be included in one or more memories 104 or 204. In addition, the commands recorded in the storage medium may be executed by one or more processors 102 or 202 to perform the operation of the base station described in the disclosure of the present specification.

Hereinbefore, preferred embodiments of the present disclosure have been described, but the technical scope of the present disclosure is not limited only to the specific embodiments. Therefore, the present disclosure may be modified, changed, or updated in various ways within the technical principles and scope defined by the appended claims.

In the exemplary system described above, methods are described according to a flow diagram by using a series of operations and blocks. However, the present disclosure is not limited to a specific order of the operations, and some operations may be performed with different operations and in a different order from those described above or simultaneously. Also, it should be understood by those skilled in the art that the operations shown in the flow diagram are not exclusive, other operations may be further included, or one or more operations of the flow diagram may be deleted without influencing the technical scope of the present disclosure.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. A method for a user equipment (UE) to perform sidelink communication, the method comprising:
   switching from an Evolved Universal Terrestrial Radio Access (E-UTRA) Vehicle-to-everything (V2X) sidelink to a New Radio (NR) V2X sidelink,
   wherein interruption on a serving cell due to the switching from the E-UTRA V2X sidelink to the NR V2X sidelink is allowed up to duration, which is interruption length based on a number of NR slots, based on Subcarrier Spacing (SCS) for the communication with the serving cell,
   wherein the interruption is for uplink and downlink of the serving cell,
   wherein the interruption length is 2 NR slots, based on the SCS for the serving cell being 15 kHz,
   wherein the interruption length is 2 NR slots, based on the SCS for the serving cell being 30 kHz, and
   wherein the interruption length is 2 NR slots, based on the SCS for the serving cell being 60 KHz.

2. The method of claim 1, wherein the number of the NR slots is 2 NR slots, based on the SCS for the serving cell being 120 KHz.

3. The method of claim 1, wherein the UE performs the switching based on a Time Division Multiplexing manner (TDM-ed manner).

4. The method of claim 1, wherein the switching is limited so that a probability of missing Acknowledgement (ACK)/Non-Acknowledgement (NACK) in communication with the serving cell becomes equal to or less than 0.5%.

5. A user equipment (UE) that performs sidelink communication, the UE comprising:
   at least one processor; and
   at least one memory for storing instructions and operably electrically connectable with the at least one processor,
   wherein the operation performed based on the instructions being executed by the at least one processor comprises:
   switching from an Evolved Universal Terrestrial Radio Access (E-UTRA) Vehicle-to-everything (V2X) sidelink to a New Radio (NR) V2X sidelink,
   wherein interruption on a serving cell due to the switching from the E-UTRA V2X sidelink to the NR V2X sidelink is allowed up to duration, which is interruption length based on a number of NR slots, based on Subcarrier Spacing (SCS) for the serving cell, wherein the interruption is for uplink and downlink of the serving cell,
wherein the interruption length is 2 NR slots, based on the SCS for the serving cell being 15 kHz,
wherein the interruption length is 2 NR slots, based on the SCS for the serving cell being 30 kHz, and
wherein the interruption length is 2 NR slots, based on the SCS for the serving cell being 60 kHz.

6. The UE of claim 5, wherein the number of the NR slots is 2 NR slots, based on that the SCS for the serving cell is 120 kHz.

7. The UE of claim 5, wherein the UE performs the switching based on a Time Division Multiplexing manner (TDM-ed manner).

8. The UE of claim 5, wherein the switching is limited so that a probability of missing Acknowledgement (ACK)/Non-Acknowledgement (NACK) for the serving cell becomes equal to or less than 0.5%.

9. The UE of claim 5, wherein the UE is an autonomous driving device communicating with at least one of a mobile terminal, a network and an autonomous driving vehicle other than the UE.

10. A user equipment (UE) that performs sidelink communication, the UE comprising:
at least one processor; and
at least one memory for storing instructions and operably electrically connectable with the at least one processor,
wherein the operation performed based on the instructions being executed by the at least one processor comprises:
switching from a New Radio (NR) Vehicle-to-everything (V2X) sidelink to an Evolved Universal Terrestrial Radio Access (E-UTRA) V2X sidelink,
wherein interruption on a serving cell due to the switching from the NR V2X sidelink to the E-UTRA V2X sidelink is allowed up to duration, which is interruption length based on a number of NR slots, based on the SCS for the serving cell,
wherein the interruption is for uplink and downlink of the serving cell,
wherein the interruption length is 2 NR slots, based on the SCS for the serving cell being 15 kHz,
wherein the interruption length is 2 NR slots, based on the SCS for the serving cell being 30 kHz, and
wherein the interruption length is 2 NR slots, based on the SCS for the serving cell being 60 KHz.

11. The UE of claim 10, wherein the number of the NR slots is 2 NR slots, based on that the SCS for the serving cell is 120 KHz.

12. The UE of claim 10, wherein the UE performs the switching based on a Time Division Multiplexing manner (TDM-ed manner).

13. The UE of claim 10, wherein the switching is limited so that a probability of missing Acknowledgement (ACK)/Non-Acknowledgement (NACK) for the serving cell becomes equal to or less than 0.5%.

* * * * *